US012665903B2

(12) United States Patent
Chan et al.

(10) Patent No.: US 12,665,903 B2
(45) Date of Patent: Jun. 23, 2026

(54) FRICTIONLESS MULTI-FACTOR AUTHENTICATION

(71) Applicant: MASTERCARD TECHNOLOGIES CANADA ULC, Vancouver (CA)

(72) Inventors: Sik Suen Chan, Richmond (CA); Igor Opushnyev, New Westminster (CA); Kyle Williams, Wentzville, MO (US); Perry McGee, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 18/782,670

(22) Filed: Jul. 24, 2024

(65) Prior Publication Data

US 2025/0039176 A1    Jan. 30, 2025

Related U.S. Application Data

(60) Provisional application No. 63/515,496, filed on Jul. 25, 2023.

(51) Int. Cl.
H04L 9/40          (2022.01)
(52) U.S. Cl.
CPC ...... H04L 63/0876 (2013.01); H04L 63/0861 (2013.01)
(58) Field of Classification Search
CPC .................................................. H04L 63/0876
See application file for complete search history.

(56) References Cited

U.S. PATENT DOCUMENTS

| | | | |
|---|---|---|---|
| 9,801,066 B1 | 10/2017 | Hanley et al. | |
| 9,843,578 B2 * | 12/2017 | Kalinichenko | ......... H04L 63/08 |
| 10,219,154 B1 * | 2/2019 | Hallock | .............. H04L 63/0876 |
| 11,637,826 B2 * | 4/2023 | Rule | ..................... H04L 63/083 |
| | | | 726/4 |
| 2019/0220583 A1 * | 7/2019 | Douglas | ................. G06V 40/70 |

(Continued)

OTHER PUBLICATIONS

International Search Report and Written Opinion for Application No. PCT/CA2024/050978 dated Nov. 20, 2024 (12 pages).

*Primary Examiner* — Simon P Kanaan
(74) *Attorney, Agent, or Firm* — Michael Best & Friedrich LLP

(57)          ABSTRACT

Devices, methods, and computer-readable media that perform frictionless multi-factor authentication. In one embodiment, a server includes a memory including a frictionless multi-factor authentication (fMFA) service, and an electronic processor communicatively coupled to the memory. The electronic processor is configured to receive a frictionless multi-factor authentication (fMFA) request and collected data of a user interface device, determine, with a unique device identifier (UDID) component, a unique device identifier (UDID) of the user interface device based on device attributes included in the collected data, determine, with a passive biometrics component, a biometrics match assessment against a historical profile, determine whether a user of the user interface device is authenticated under multi-factor authentication (MFA) based on the UDID and the biometrics match assessment, responsive to determining that the user is authenticated under multi-factor authentication (MFA), output a fMFA authentication response that indicates authentication of the user.

20 Claims, 3 Drawing Sheets

(56) References Cited

U.S. PATENT DOCUMENTS

| 2020/0053558 | A1 |   | 2/2020 | Hallock |
| 2020/0380112 | A1 | * | 12/2020 | Allen ..................... G06F 21/44 |
| 2022/0100834 | A1 |   | 3/2022 | Chan et al. |

* cited by examiner

FRICTIONLESS MULTI-FACTOR AUTHENTICATION

CROSS-REFERENCE TO RELATED APPLICATION

This application claims priority to, and the benefit of, U.S. Provisional Application No. 63/515,496, filed on Jul. 25, 2023, the entire contents of which is incorporated herein by reference.

FIELD

The present disclosure relates generally to user authentication. More specifically, the present disclosure relates to devices, methods, systems, and computer-readable media that perform frictionless multi-factor authentication.

BACKGROUND

Multi-factor authentication (MFA) is commonly used to authenticate a user and takes various different forms. MFA requires two of three factors to be satisfied in order to perform a valid authentication. The three factors are an inherence factor, a possession factor, and a knowledge factor. The inherence factor is indicating what you are, the possession factor is indicating what you have, and the knowledge factor is indicating what you know.

One of the most common forms of MFA is a user entering a password followed by entering a one-time-password (OTP). The password and the OTP satisfy the possession factor and the knowledge factor, respectively.

However, a challenge exists with MFA because of the friction associated with requiring the user to enter the OTP after the password. Some users either do not enable MFA or intentionally disable MFA because these users do not want to provide an OTP or similar information.

SUMMARY

The present disclosure solves the aforementioned challenge by performing frictionless multi-factor authentication. The identification of a user interface device and the identification of the user may be used to form a response that satisfies "frictionless" multi-factor authentication compared to "non-frictionless" multi-factor.

For example, the identification of the user is achieved by turning behavioral data of the user into a biometrics match assessment against a historical profile of the user. The identification of the user interface device is achieved by turning device attributes and additional context data into a unique device identifier (UDID) of the user interface device. The biometrics match assessment against a historical profile may be used to satisfy the inherence factor. The UDID may be used to satisfy the possession factor.

The combination of the identification of the user and the identification of the user interface device achieves more than the expected sum because the combination may be used to provide a valid authentication under frictionless multi-factor authentication. In this case, a user no longer has to enter an OTP to satisfy a multi-factor authentication. However, in the event that the UDID or the biometrics match assessment is unable to produce a result for any reason, the user may still fallback to a non-frictionless MFA. In either "frictionless" or "non-frictionless" MFA, a breach of one of the factors must not also result in a compromise of the other factor(s) being used.

One example of the present disclosure is a server for performing a frictionless multi-factor authentication (fMFA). The server includes a memory including a frictionless multi-factor authentication (fMFA) service, and an electronic processor communicatively coupled to the memory. The electronic processor is configured to receive a frictionless multi-factor authentication (fMFA) request and collected data of a user interface device, determine, with a unique device identifier (UDID) component, a unique device identifier (UDID) of the user interface device based on device attributes included in the collected data, determine, with a passive biometrics component, a biometrics match assessment using user input data and device interaction data included in the collected data against a historical profile, determine whether a user of the user interface device is authenticated under multi-factor authentication (MFA) based on the UDID and the biometrics match assessment, responsive to determining that the user is authenticated under multi-factor authentication (MFA), output a fMFA authentication response that indicates authentication of the user, and responsive to determining that the user is not authenticated under multi-factor authentication (MFA), output a fMFA denial response that indicates no authentication of the user.

Another example of the present disclosure includes a method for performing a frictionless multi-factor authentication (fMFA). The method includes receiving, with an electronic processor of a server, a frictionless multi-factor authentication (fMFA) request and collected data of a user interface device. The method includes determining, with the electronic processor and a unique device identifier (UDID) component, a unique device identifier (UDID) of the user interface device based on device attributes included in the collected data. The method includes determining, with the electronic processor and a passive biometrics component, a biometrics match assessment using user input data and device interaction data included in the collected data against a historical profile. The method includes determining, with the electronic processor, whether a user of the user interface device is authenticated under multi-factor authentication (MFA) based on the UDID and the biometrics match assessment. The method includes responsive to determining that the user is authenticated under multi-factor authentication (MFA), outputting, with the electronic processor, a fMFA authentication response that indicates authentication of the user. The method also includes responsive to determining that the user is not authenticated under multi-factor authentication (MFA), outputting, with the electronic processor, a fMFA denial response that indicates no authentication of the user.

Yet another example of the present disclosure is a non-transitory computer-readable medium comprising instructions that, when executed by an electronic processor, causes the electronic processor to perform a set of operations. The set of operations includes receiving a frictionless multi-factor authentication (fMFA) request and collected data of a user interface device. The set of operations includes determining, with a unique device identifier (UDID) component, a unique device identifier (UDID) of the user interface device based on device attributes included in the collected data. The set of operations includes determining, with a passive biometrics component, a biometrics match assessment using user input data and device interaction data included in the collected data against a historical profile. The set of operations includes determining whether a user of the user interface device is authenticated under multi-factor authentication (MFA) based on the UDID and the biometrics match assessment. The set of operations includes responsive to determining that the user is authenticated under multi-factor authentication (MFA), outputting a fMFA authentication response that indicates authentication of the user. The set of operations also includes responsive to determining that the user is not authenticated under multi-factor authentication (MFA), outputting a fMFA denial response that indicates no authentication of the user.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
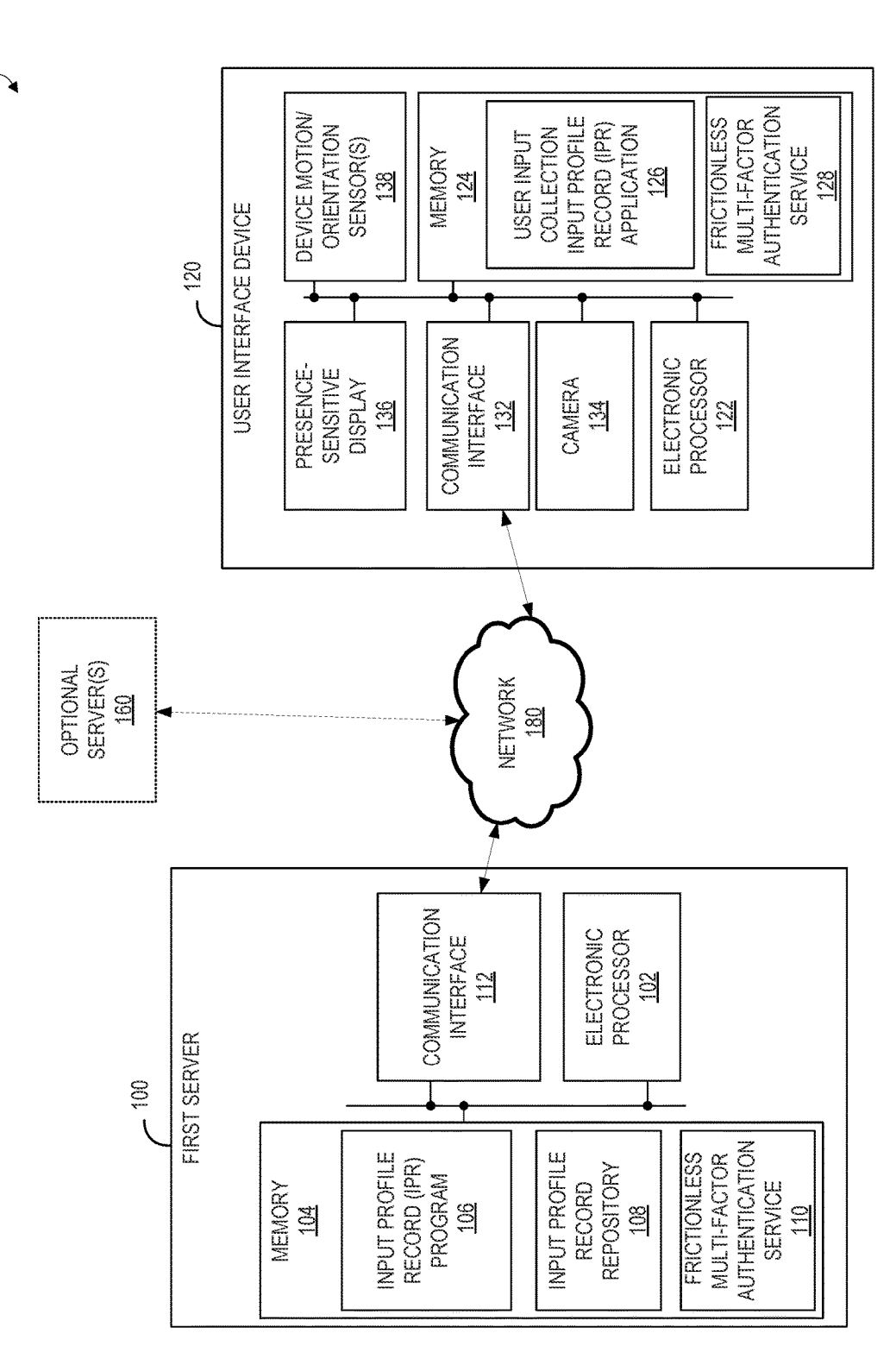
FIG. 1 is a block diagram illustrating a system with user identification using a blended response from a dual-layer identification service, in accordance with various aspects of the present disclosure.

FIG. 1 is a block diagram illustrating a system 10 with user identification using a blended response from a dual-layer identification service. It should be understood that, in some embodiments, there are different configurations from the configuration illustrated in FIG. 1. The functionality described herein may be extended to any number of servers providing distributed processing.

In the example of FIG. 1, the system 10 includes a first server 100, a user interface device 120, optional servers 160, and a network 180. The first server 100 includes an electronic processor 102 (for example, a microprocessor or another suitable processing device), a memory 104 (for example, a non-transitory computer-readable storage medium), and a communication interface 112. It should be understood that, in some embodiments, the first server 100 may include fewer or additional components in configurations different from that illustrated in FIG. 1. Also, the first server 100 may perform additional functionality than the functionality described herein. In addition, the functionality of the first server 100 may be incorporated into other servers, e.g., the optional server(s) 160. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machineexecutable instructions regarding an input profile record (IPR) program 106 and a frictionless multi-factor authentication service 110. In some examples, the data storage area may store data regarding an input profile record repository 108.

The IPR application 106 causes the electronic processor 102 to collect and store input profile records in the input profile record repository 108. Specifically, the IPR application 106 causes the electronic processor 102 to parse the IPR content received from a user interface device, determine biometric features based on the current IPR and historical/older IPRs associated with the user, and perform user identification using a biometric identification algorithm that compares current biometrics features based on a current IPR to the historical biometric features based on a set of historical IPRs. In some examples, a successful user identification may require ten historical IPRs associated with the user to establish a "user profile."

In some examples, the IPR application 106 also causes the electronic processor 102 to update a "user profile" stored in the input profile record repository 108. The "user profile" may be an account/device pair that stores the last x number of IPRs that are updated as a rolling window. In these examples, a single updated user profile may be functionally equivalent to a plurality of input profile records as described herein. Additionally, the user identification with the IPRs is a "passive" identification that does not need to query a user for additional information.

In some examples, the input profile record repository 108 is a central repository including a plurality of input profile records. Each input profile record is associated with a specific user. In some examples, an input profile record stored in the input profile record repository 108 may be updated periodically with the IPR application 106 as described above. The input profile record associated with the user is indicative of an identity of a user over a specific period of time. In other words, the input profile record as described herein solves the aforementioned problems with user identification because the input profile record is a dynamic identification of a user over a specific period of time rather than occurring at certain points in time and fixed to an initial biometric used to set up the user identification.

The frictionless multi-factor authentication service 110 includes a passive biometrics component and a unique device identifier (UDID) component. In some examples, the passive biometrics component includes a plurality of passive biometrics models that may identify a user of the user interface device 120 based on a plurality of input profile records that are stored in the input profile record repository. In other words, the passive biometrics component turns behavioral data into a biometrics match assessment against a historical profile (i.e., input profiles records from the input profile record repository).

Additionally, in some examples, the UDID component includes device identification rules that may the user interface device 120 based on a plurality of device attributes. In other words, the UDID component turns device attributes and additional context data into a device identifier that is unique to the device (i.e., a UDID that is unique to the user interface device 120). In some examples, the plurality of device attributes may include two or more of: 1) minor version, 2) major version, 3) screen resolution, 4) language, 5) build manufacturer, and 6) Subscriber Identity Module (SIM) operator.

Further, in some examples, the passive biometrics component and the unique device identifier (UDID) component perform the functions described herein with respect to "frictionless multi-factor authentication" entirely within the first server 100. In other examples, the passive biometrics component and the unique device identifier (UDID) component are sets of instructions for performing the functions described herein with respect to "frictionless multi-factor authentication" with other optional server(s) 160 (e.g., a passive biometrics server and a UDID server).

In some examples, a first passive model of the plurality of passive biometrics models may identify the user of the user interface device 120 with a plurality of input profile records, each IPR based on a plurality of user inputs (e.g., user inputs with respect to a username and password) at a login page. Additionally, or alternatively, in some examples, a second model of the plurality of passive biometrics models may identify the user associated with a plurality of IPRs, each based on a plurality of user inputs (e.g., user inputs with respect to a behavioral one-time-passcode (OTP)) at a multifactor authentication page.

In yet other examples, instead of or in addition to the plurality of passive biometrics models being dedicated to different webpages (e.g., a login page or a multifactor authentication page), the plurality of passive biometrics models may also be associated with different geographic regions. For example, a first passive biometrics model of the plurality of passive biometrics models may be associated with the United States and a second passive biometrics model of the plurality of passive biometrics models may be associated the European Union. The first passive biometrics model may meet the false-positive standard required by the United States, for example, one false positive in one thousand authentications. By comparison, the second passive biometrics model may meet the false-positive standard required by the European Union, for example, one false positive in ten thousand authentications.

In some examples, geographic regions that share the same false-positive standard may also share the same passive biometrics model. In other examples, each geographic region may be assigned a specific passive biometrics model that is customized to the language and type of inputs that are unique to that geographic region. In yet other examples, all geographics regions may be assigned the same passive biometrics model that has the lowest false-positive rate, but also has the highest likelihood of a denied authentication.

The communication interface 112 receives data from and provides data to devices external to the first server 100, such as the user interface device 120 via the network 180. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet.

In the example of FIG. 1, the user interface device 120 includes an electronic processor 122 (for example, a microprocessor or another suitable processing device), a memory 124 (for example, a non-transitory computer-readable storage medium), a communication interface 132, a camera 134, a presence-sensitive display 136, and a device motion/orientation sensor(s) 138. In some examples, the user interface device may be a smartphone, tablet, laptop, or other suitable user interface device with a presence-sensitive display and an orientation sensor. As illustrated in FIG. 1, the electronic processor 122, the memory 124, the communication interface 132, the camera 134, the presence-sensitive display 136, and the device motion/orientation sensor(s) 138 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes a user input collection and input profile record (IPR) application 126 and a frictionless multi-factor authentication service 128. In some examples, the user input collection and IPR application 126 and the frictionless multi-factor authentication service 128 may each be a stand-alone application. In other examples, the user input collection and IPR application 126 and the frictionless multi-factor authentication service 128 may be part of a separate application (e.g., a camera application, a banking application, or other suitable application).

The user input collection and IPR application 126 causes the electronic processor 122 to collect user inputs, i.e., user interactions, from a user relative to a mobile application (e.g., time to fill data field entries, use of specific autofill, or other suitable user inputs) of the user interface device 120 and generate an input profile record (IPR) based on the user inputs (also referred to as a "mobile platform"). The user input collection and IPR application 126 may also cause the electronic processor 122 to collect user inputs at a particular website (e.g., time to fill data field entries, use of specific autofill, or other suitable user inputs) and generate (or update) the input profile record based on these user inputs (also referred to as a "web platform").

In some examples, the user input collection and IPR application 126 causes the electronic processor 122 to collect user inputs with respect to the presence-sensitive display 136 (e.g., type of keyboard, typing speed, use of patterns, or other suitable user inputs (see Tables 1-3)). In these examples, the user input collection and IPR application 126 may also cause the electronic processor 122 to output the generated IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

In other examples, the user input collection and IPR application 126 causes the electronic processor 122 to collect user inputs with respect to the camera 134 (e.g., facial recognition, user gestures, or other suitable user inputs), which may be part of the mobile platform. In these examples, the user input collection and IPR application 126 may also cause the electronic processor 122 to generate (or update) an IPR based on the aforementioned user inputs and output the IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

The frictionless multi-factor authentication service 128 collects data regarding the user interface device 120 and the user of the user interface device 120. For example, the frictionless multi-factor authentication service 128 determines device attributes of the user interface device 120 and retrieves one or more IPRs generated by the user input collection and IPR application 126. The device attributes may include any common attributes that do not require permission used in combination to produce a device "fingerprint" or "signature." The attributes would vary based on device type, for example, desktop browser, mobile browser, or native mobile application.

The frictionless multi-factor authentication service 128 outputs the collected data to the first server 100 along with a frictionless multi-factor authentication request when the user of the user interface device 120 accesses a resource that requires multi-factor authentication. As described in greater detail below, the frictionless multi-factor authentication service 128 interacts with the frictionless multi-factor authentication service 110 to provide the user of the user interface device 120 with multi-factor authentication that requires no knowledge-based input by the user, and therefore, "frictionless" to the user.

The communication interface 132 receives data from and provides data to (e.g., generated IPR(s)) devices external to the user interface device 120, i.e., the server 100. For example, the communication interface 132 may include a port or connection for receiving a wired connection (for example, an Ethernet cable, fiber optic cable, a telephone cable, or the like), a wireless transceiver, or a combination thereof.

The camera 134 includes an image sensor that generates and outputs image data of a subject. In some examples, the camera 134 includes a semiconductor charge-coupled device (CCD) image sensor, a complementary metal-oxide-semiconductor (CMOS) image sensor, or other suitable image sensor. The electronic processor 122 receives the image data of the subject that is output by the camera 134.

The presence-sensitive display 136 includes a display screen with an array of pixels that generate and output images. In some examples, the display screen is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The presence-sensitive display 136 also includes circuitry that is configured to detect the presence of the user. In some examples, the circuitry is a resistive or capacitive panel that detects the presence of an object (e.g., a user's finger).

The device motion/orientation sensor(s) 138 is a sensor that detects a movement and/or an orientation of the user interface device 120. In some examples, the device motion/orientation sensor(s) 138 is an accelerometer, gyroscope, magnetometer, or other suitable device motion/orientation sensor that detects the motion and/or orientation of the user interface device 120.

It should be understood that, in some embodiments, the server 100 may include fewer or additional components in configurations different from that illustrated in FIG. 1. Also, the server 100 may perform additional functionality than the functionality described herein. In addition, some of the functionality of the user interface device 120 (for example, the IPR generation) may be incorporated into other servers (e.g., incorporated into the server 100 or the optional server(s) 160). Likewise, some of the functionality of the server 100 may be incorporated into the user interface device 120 (for example, functionality associated with a unique device identifier (UDID) component and a passive biometrics component as described in greater detail below).

The optional server(s) 160 may be similar to the first server 100. For example, the optional server(s) 160 may include an electronic processor (for example, a microprocessor or another suitable processing device), a memory (for example, a non-transitory computer-readable storage medium), and a communication interface. It should be understood that, in some embodiments, the optional server(s) 160 may include fewer or additional components in configurations different from the first server 100 that is illustrated in FIG. 1. Also, the optional server(s) 160 may perform additional or different functionality than the functionality described herein with respect to the first server 100. In other embodiments, the functionality described herein with respect to the optional server(s) 160 may be performed by the first server 100 and the optional server(s) 160 may be omitted.

Figure 2:
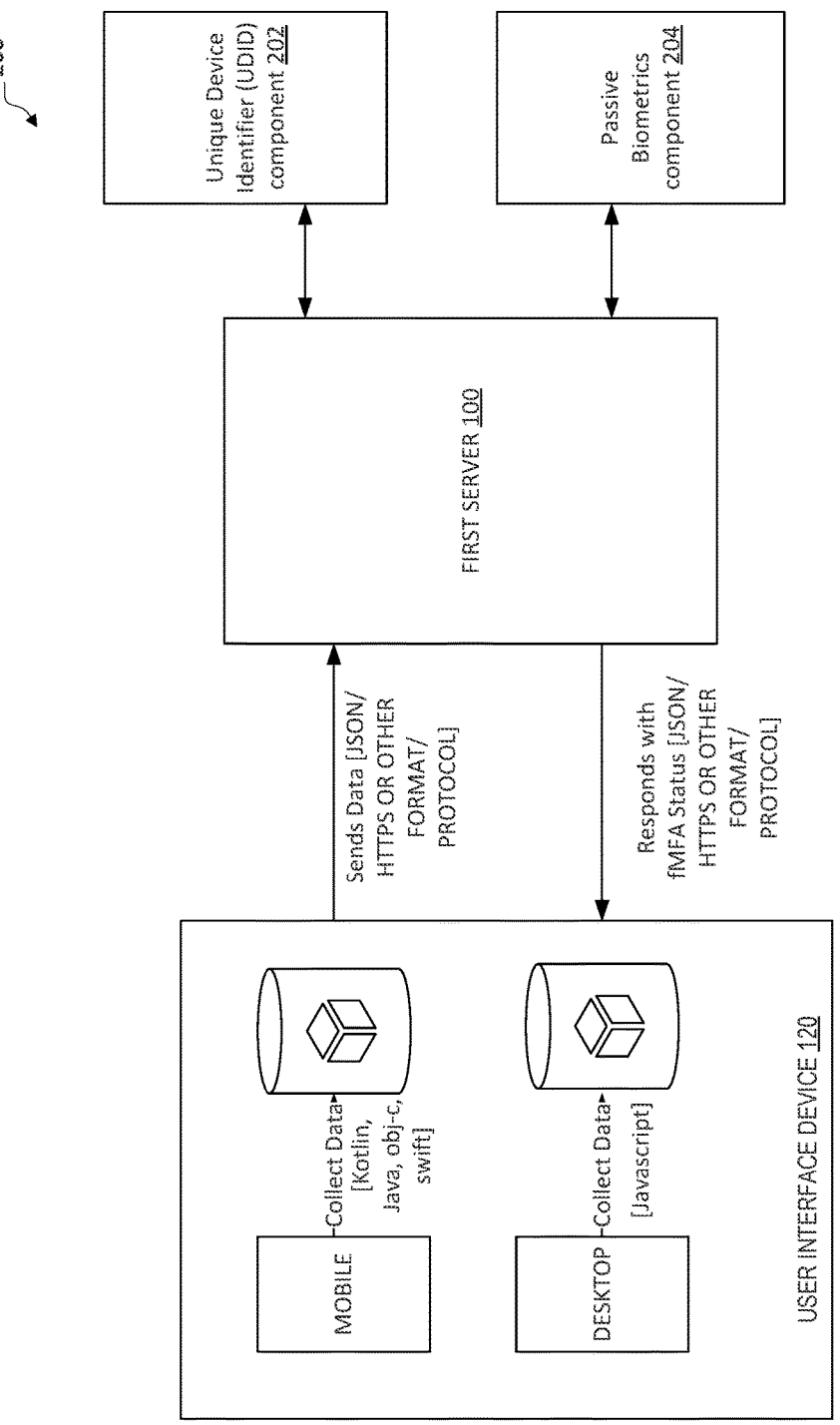
FIG. 2 is a flow diagram illustrating the dual-layer service of FIG. 1, in accordance with various aspects of the present disclosure.

FIG. 2 is a block diagram illustrating a second example 200 of communication between the first server 100 and the user interface device 120 of FIG. 1, in accordance with various aspects of the present disclosure. FIG. 2 is described with respect to FIG. 1. As illustrated in FIG. 2, the second example 200 includes the user interface device 120 communicating with the first server 100, and the first server 100 is interacting with a unique device identifier component 202 and a passive biometrics component 204.

In the example of FIG. 2, the user interface device 120 may be a mobile device or a desktop device performing the user input collection and IPR application 126 to collect data regarding device attributes and user inputs. When a user accesses a resource (e.g., webpage, application, or other resource) that requires MFA, the user interface device 120 performs the frictionless multi-factor authentication service 128 by outputting a fMFA request along with the collected data to the first server 100 via the network 180. For example, when a user enters a password to a bank application, the user interface device 120 performs the frictionless multi-factor authentication service 128 by outputting a fMFA request along with the collected data to the first server 100 via the network 180. With respect to the mobile device, data collection may be performed with Kotlin, Java, Objective-C (obj-c), Swift, or other suitable programming language. With respect to the desktop device, data may be collected with JavaScript, TypeScript, or other suitable programming language. With respect to the desktop and mobile devices data output may be in JavaScript Object Notation (JSON) or other suitable format. From the device to the server, data may be transported with Hypertext Transfer Protocol Secure (HTTPS), or other suitable data transfer protocol.

When the first server 100 receives the fMFA request and the collected data from the user interface device 120, the first server 100 performs the frictionless multi-factor authentication service 110 by extracting the device attributes, the user inputs, user history, and account history from the collected data and providing the device attributes, the user history, and the account history to the UDID component 202 and the user inputs to the passive biometrics component 204. In some examples, the user inputs includes typing data and/or behavior data that is related to form inputs (i.e., the filling of data fields) by the user. Additionally, in these examples, the user inputs may further include sensor data and/or behavior data that is also related to how the user is interacting with the device itself (e.g., how the user is holding the device itself).

The UDID component 202 generates a UDID for the user interface device 120 based on the device attributes of the user interface device 120 and communicates the UDID to the first server 100. The passive biometrics component 204 generates a biometrics match assessment against a historical profile (e.g., against some of the plurality of IPRs) and communicates the biometrics match assessment to the first server 100.

When receiving the UDID and the biometrics match assessment, the first server 100 also performs the frictionless multi-factor authentication service 110 by determining a frictionless multi-factor authentication status (authentication or denied authentication) based on the UDID and the biometrics match assessment, and providing the fMFA status to the user interface device 120. The frictionless multi-factor authentication status may be output to the user interface device 120 in the form of JavaScript Object Notation (JSON), Hypertext Transfer Protocol Secure (HTTPS), or other suitable programming language.

When receiving the fMFA status from the first server 100, the user interface device 120 may provide the fMFA status to the resource (e.g., application) being accessed by the user. The resource authorizes or denies the user's access to the resource based on the fMFA status that is received. When the resource authorizes the user's access to the resource based on the fMFA status that is received, the frictionless multi-factor authentication service 110 and frictionless multi-factor authentication service 128 have achieved frictionless MFA because the user was authenticated under MFA without being required to enter an OTP or other information.

In some examples, when the fMFA status from the first server 100 is denied authentication, the frictionless multi-factor authentication service 128 may simply revert to requiring the user to provide additional information, e.g., an OTP. The frictionless multi-factor authentication service 128 may then provide the resource with an MFA status (authentication) instead of the fMFA status (denied authentication).

In some examples, the UDID component 202 and the passive biometrics component 204 may be components that are internal to the frictionless multi-factor authentication service 110. In other examples, the UDID component 202 and the passive biometrics component 204 may be stand-alone servers (e.g., the optional server(s) 160) that are external and remote to the first server 100.

Figure 3:
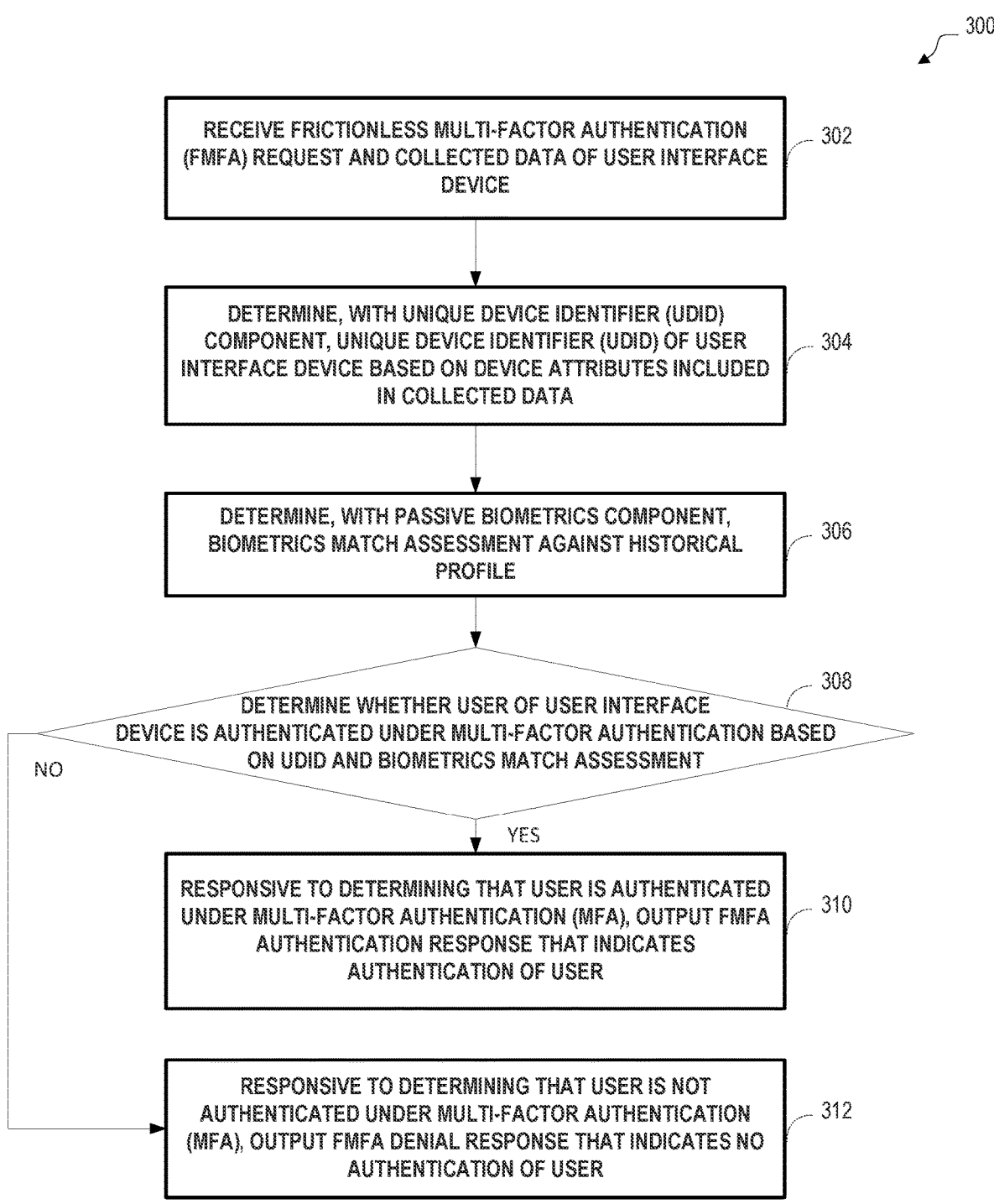
FIG. 3 is a flowchart illustrating a method for identifying a user, in accordance with various aspects of the present disclosure.

FIG. 3 is a flowchart illustrating a method 300 for performing a frictionless multi-factor authentication (fMFA), in accordance with various aspects of the present disclosure. FIG. 3 is described with respect to FIGS. 1 and 2.

The method 300 includes receiving, with an electronic processor of a server, a frictionless multi-factor authentication (fMFA) request and collected data of a user interface device (at block 302). For example, the electronic processor 102 of the first server 100 receives a frictionless multi-factor authentication (fMFA) request and collected data of the user interface device 120.

The method 300 includes determining, with the electronic processor and a unique device identifier (UDID) component, a unique device identifier (UDID) of the user interface device based on device attributes included in the collected data (at block 304). For example, the electronic processor 102 determines, with the unique device identifier (UDID) component 202, a unique device identifier (UDID) of the user interface device 120 based on device attributes included in the collected data.

The method 300 includes determining, with the electronic processor and a passive biometrics component, a biometrics match assessment against a historical profile (at block 306). For example, the electronic processor 102 determines, with the passive biometrics component 204, a biometrics match assessment against a historical profile (e.g., a plurality of IPRs).

The method 300 includes determining, with the electronic processor, whether a user of the user interface device is authenticated under multi-factor authentication (MFA) based on the UDID and the biometrics match assessment (at decision block 308). For example, the electronic processor 102 determines whether a user of the user interface device 120 is authenticated under multi-factor authentication (MFA) based on the UDID and the biometrics match assessment.

The method 300 includes responsive to determining that the user is authenticated under multi-factor authentication (MFA) ("YES" at decision block 308), outputting, with the electronic processor, a fMFA authentication response that indicates authentication of the user (at block 310). For example, in response to determining that the user is authenticated under multi-factor authentication (MFA), the electronic processor 102 controls the communication interface 112 to output a fMFA authentication response that indicates authentication of the user.

The method 300 includes responsive to determining that the user is not authenticated under multi-factor authentication (MFA) ("NO" at decision block 308), outputting, with the electronic processor, a fMFA denial response that indicates no authentication of the user (at block 312). For example, in response to determining that the user is not authenticated under multi-factor authentication (MFA), the electronic processor 102 controls the communication interface 112 to output a fMFA denial response that indicates no authentication of the user.

Additionally, in some examples, in response to determining that the user is not authenticated under multi-factor authentication (MFA), the electronic processor 102 may perform non-frictionless MFA. For example, the electronic processor 102 may start the MFA process from the beginning under non-frictionless MFA.

Alternatively, in some examples, the electronic processor 102 may determine which factor caused the fMFA denial response with respect to the UDID and the biometrics match assessment. Responsive to determining which factor caused the fMFA denial response, the electronic processor 102 perform a hybrid frictionless/non-frictionless MFA by requesting information necessary to address the factor that caused the fMFA denial response. The electronic processor 102 may then supplement the UDID or the biometrics match assessment with the information that is requested to then determine whether the user is authenticated under multi-factor authentication (MFA) (at block 306).

In some examples, determining, with the electronic processor and the UDID component, the unique device identifier (UDID) of the user interface device based on the device attributes included in the collected data, the method 300 may further include extracting the device attributes, the user history, and the account history included in the collected data, transmitting a UDID request, the device attributes, the user history, and the account history to a UDID server, and receiving the UDID from the UDID server.

In some examples, determining, with the electronic processor and the UDID component, the unique device identifier (UDID) of the user interface device based on the device attributes included in the collected data, the method 300 may further include extracting the device attributes, user history, and account history included in the collected data, and determining, with a frictionless multi-factor authentication service that is stored in a memory of the server, the UDID based on the device attributes, the user history, and the account history.

In some examples, determining, with the electronic processor and the passive biometrics component, the biometrics match assessment against the historical profile, the method 300 may further include extracting user input data and device interaction data included in the collected data, transmitting a biometrics match assessment request and the user input data and the device interaction data to a passive biometrics server, and receiving the biometrics match assessment from the passive biometrics server.

In some examples, the method 300 may further include determining, with the electronic processor, a location of the user interface device based on one or more of the device attributes included in the collected data, and determining, with the electronic processor and the passive biometrics component, the biometrics match assessment against the historical profile further includes selecting the passive biometrics server from a plurality of passive biometrics servers based on the location of the user interface device. In these examples, the passive biometrics server that is selected generates the biometrics match assessment using a passive biometrics model that meets passive biometric standards for a geographic region including the location.

In one example, one of the device attributes may be an IP address that is registered in a City and State of the United States. In this example, the electronic processor 102 may determine that the location of the user interface device 120 is in the City and the State of the United States and the electronic processor 102, with the passive biometrics component 204, selects a passive biometrics server that generates biometrics match assessments in accordance with passive biometrics standards in the United States. In some examples, the passive biometric server may be located in the United States. In other examples, the passive biometric server may be located outside of the United States.

In a different example, one of the device attributes may be an IP address that is registered in a City and Country of the European Union. In this example, the electronic processor 102 may determine that the location of the user interface device 120 is in the City and the Country of the European Union and the electronic processor 102, with the passive biometrics component 204, selects a passive biometrics server that generates biometrics match assessments in accordance with passive biometrics standards in the European Union. In some examples, the passive biometric server may be located in the European. In other examples, the passive biometric server may be located outside of the European.

One issue with partitioning the data to regions is that device IDs for the same device might be different in other regions. However, the algorithm described herein attempts to reduce this issue as much as possible by the use of "global IDs," although the issue may still occur depending on how the model is tuned and what attributes and other data is received. Additionally, the issue may also mitigated by routing a user's traffic according to the location of the service provider or merchant selected by the user rather than the user's current location. When the user selects a service provider or merchant located in the U.S., the user's data may be routed to the U.S. for processing as described herein.

In some examples, determining, with the electronic processor and the passive biometrics component, the biometrics match assessment against the historical profile, the method 300 may further include extracting user input data and device interaction data included in the collected data, and determining the biometrics match assessment with a frictionless multi-factor authentication service that is stored in a memory of the server.

In some examples, the method 300 may further include determining, with the electronic processor, a location of the user interface device based on one or more of the device attributes included in the collected data, and determining, with the electronic processor and the passive biometrics component, the biometrics match assessment against the historical profile further includes selecting a passive biometric model from a plurality of passive biometric models based on the location of the user interface device. In these examples, the passive biometric model that is selected meets passive biometric standards for a geographic region including the location.

In one example, one of the device attributes may be an IP address that is registered in a City and State of the United States. In this example, the electronic processor 102 may determine that the location of the user interface device 120 is in the City and the State of the United States and the electronic processor 102, with the passive biometrics component 204, selects a passive biometrics model that generates biometric match assessments in accordance with passive biometrics standards in the United States.

In a different example, one of the device attributes may be an IP address that is registered in a City and Country of the European Union. In this example, the electronic processor 102 may determine that the location of the user interface device 120 is in the City and the Country of the European Union and the electronic processor 102, with the passive biometrics component 204, selects a passive biometrics model that generates biometric match assessments in accordance with passive biometrics standards in the European Union.

In some examples, receiving, with the electronic processor of the server, the frictionless multi-factor authentication (fMFA) request and the collected data of the user interface device, the method 300 may further include receiving both the fMFA request and the collected data of the user interface device from the user interface device.

In some examples, receiving, with the electronic processor of the server, the frictionless multi-factor authentication (fMFA) request and the collected data of the user interface device, the method 300 may further include receiving the fMFA request and the collected data of the user interface device from a second server that is different from the server.

The following are enumerated examples of the servers, methods, and non-transitory computer-readable media of the present disclosure. Example 1: a server for performing a frictionless multi-factor authentication (fMFA), the server comprising: a memory including a frictionless multi-factor authentication (fMFA) service, and an electronic processor communicatively coupled to the memory, the electronic processor is configured to: receive a frictionless multi-factor authentication (fMFA) request and collected data of a user interface device, determine, with a unique device identifier (UDID) component, a unique device identifier (UDID) of the user interface device based on device attributes included in the collected data, determine, with a passive biometrics component, a biometrics match assessment using user input data and device interaction data included in the collected data against a historical profile, determine whether a user of the user interface device is authenticated under multi-factor authentication (MFA) based on the UDID and the biometrics match assessment, responsive to determining that the user is authenticated under multi-factor authentication (MFA), output a fMFA authentication response that indicates authentication of the user, and responsive to determining that the user is not authenticated under multi-factor authentication (MFA), output a fMFA denial response that indicates no authentication of the user.

Example 2: the server of Example 1, wherein, to determine the unique device identifier (UDID) of the user interface device based on the device attributes included in the collected data, the electronic processor is further configured to: extract the device attributes, user history, and account history included in the collected data, transmit a UDID request, the device attributes, the user history, and the account history to a UDID server, and receive the UDID from the UDID server.

Example 3: the server of Examples 1 or 2, wherein, to determine the unique device identifier (UDID) of the user interface device based on the device attributes included in the collected data, the electronic processor is further configured to: extract the device attributes, user history, and account history included in the collected data, and generate, with the fMFA service, the UDID based on the device attributes, the user history, and the account history.

Example 4: the server of Examples 1-3, wherein, to determine the biometrics match assessment using the user input data and the device interaction data included in the collected data against the historical profile, the electronic processor is further configured to: extract the user input data and the device interaction data included in the collected data, transmit a biometrics match assessment request, the user input data, and the device interaction data to a passive biometrics server, and receive the biometrics match assessment from the passive biometrics server.

Example 5: the server of Example 4, wherein the electronic processor is further configured to: determine a location of the user interface device based on one or more of the device attributes included in the collected data, wherein, to determine the biometrics match assessment using the user input data and the device interaction data included in the collected data against the historical profile, the electronic processor is further configured to: select the passive biometrics server from a plurality of passive biometrics servers based on the location of the user interface device, wherein the passive biometrics server that is selected generates the biometrics match assessment using a passive biometrics model that meets passive biometric standards for a geographic region including the location.

Example 6: the server of Examples 1-5, wherein, to determine the biometrics match assessment using the user input data and the device interaction data included in the collected data against the historical profile, the electronic processor is further configured to: extract the user input data and the device interaction data included in the collected data, and determine the biometrics match assessment with the fMFA service.

Example 7: the server of Examples 1-6, wherein the electronic processor is further configured to: determine a location of the user interface device based on one or more of the device attributes included in the collected data, wherein, to determine the biometrics match assessment using the user input data and the device interaction data included in the collected data against the historical profile, the electronic processor is further configured to: select a passive biometric model from a plurality of passive biometric models based on the location of the user interface device, wherein the passive biometric model that is selected meets passive biometric standards for a geographic region including the location.

Example 8: the server of Examples 1-7, wherein, to receive the frictionless multi-factor authentication (fMFA) request and the collected data of the user interface device, the electronic processor is further configured to receive both the fMFA request and the collected data of the user interface device from the user interface device.

Example 9: the server of Examples 1-8, wherein, to receive the frictionless multi-factor authentication (fMFA) request and the collected data of the user interface device, the electronic processor is further configured to the receive fMFA request and the collected data of the user interface device from a second server that is different from the server.

Example 10: a method for performing a frictionless multi-factor authentication (fMFA), the method comprising: receiving, with an electronic processor of a server, a frictionless multi-factor authentication (fMFA) request and collected data of a user interface device; determining, with the electronic processor and a unique device identifier (UDID) component, a unique device identifier (UDID) of the user interface device based on device attributes included in the collected data; determining, with the electronic processor and a passive biometrics component, a biometrics match assessment using user input data and device interaction data included in the collected data against a historical profile; determining, with the electronic processor, whether a user of the user interface device is authenticated under multi-factor authentication (MFA) based on the UDID and the biometrics match assessment; responsive to determining that the user is authenticated under multi-factor authentication (MFA), outputting, with the electronic processor, a fMFA authentication response that indicates authentication of the user; and responsive to determining that the user is not authenticated under multi-factor authentication (MFA), outputting, with the electronic processor, a fMFA denial response that indicates no authentication of the user.

Example 11: the method of Example 10, wherein determining, with the electronic processor and the UDID component, the unique device identifier (UDID) of the user interface device based on the device attributes included in the collected data further includes extracting the device attributes, user history, and account history included in the collected data, transmitting a UDID request, the device attributes, the user history, and the account history to a UDID server, and receiving the UDID from the UDID server.

Example 12: the method of Examples 10 or 11, wherein determining, with the electronic processor and the UDID component, the unique device identifier (UDID) of the user interface device based on the device attributes included in the collected data further includes extracting the device attributes, user history, and account history included in the collected data, and generating, with a frictionless multi-factor authentication service that is stored in a memory of the server, the UDID based on the device attributes, the user history, and the account history.

Example 13: the method of Examples 10-12, wherein determining, with the electronic processor and the passive biometrics component, the biometrics match assessment using the user input data and the device interaction data included in the collected data against the historical profile further includes extracting the user input data and the device interaction data included in the collected data, transmitting a biometrics match assessment request, the user input data, and the device interaction data to a passive biometrics server, and receive the biometrics match assessment from the passive biometrics server.

Example 14: the method of Example 13, further comprising: determining, with the electronic processor, a location of the user interface device based on one or more of the device attributes included in the collected data, wherein determining, with the electronic processor and the passive biometrics component, the biometrics match assessment using the user input data and the device interaction data included in the collected data against the historical profile further includes selecting the passive biometrics server from a plurality of passive biometrics servers based on the location of the user interface device, wherein the passive biometrics server that is selected generates the biometrics match assessment using a passive biometrics model that meets passive biometric standards for a geographic region including the location.

Example 15: the method of Examples 10-14, wherein determining, with the electronic processor and the passive biometrics component, the biometrics match assessment using the user input data and the device interaction data included in the collected data against the historical profile further includes extracting the user input data and the device interaction data included in the collected data, and determining the biometrics match assessment with a frictionless multi-factor authentication service that is stored in a memory of the server.

Example 16: the method of Examples 10-15, further comprising: determining, with the electronic processor, a location of the user interface device based on one or more of the device attributes included in the collected data, wherein determining, with the electronic processor and the passive biometrics component, the biometrics match assessment using the user input data and the device interaction data included in the collected data against the historical profile further includes selecting a passive biometric model from a plurality of passive biometric models based on the location of the user interface device, wherein the passive biometric model that is selected meets passive biometric standards for a geographic region including the location.

Example 17: the method of Examples 10-16, wherein receiving, with the electronic processor of the server, the frictionless multi-factor authentication (fMFA) request and the collected data of the user interface device further includes receiving both the fMFA request and the collected data of the user interface device from the user interface device.

Example 18: the method of Examples 10-17, wherein receiving, with the electronic processor of the server, the frictionless multi-factor authentication (fMFA) request and the collected data of the user interface device further includes receiving the fMFA request and the collected data of the user interface device from a second server that is different from the server.

Example 19: a non-transitory computer-readable medium comprising instructions that, when executed by an electronic processor, causes the electronic processor to perform a set of operations comprising: receiving a frictionless multi-factor authentication (fMFA) request and collected data of a user interface device; determining, with a unique device identifier (UDID) component, a unique device identifier (UDID) of the user interface device based on device attributes included in the collected data; determining, with a passive biometrics component, a biometrics match assessment using user input data and device interaction data included in the collected data against a historical profile; determining whether a user of the user interface device is authenticated under multi-factor authentication (MFA) based on the UDID and the biometrics match assessment; responsive to determining that the user is authenticated under multi-factor authentication (MFA), outputting a fMFA authentication response that indicates authentication of the user; and responsive to determining that the user is not authenticated under multi-factor authentication (MFA), outputting a fMFA denial response that indicates no authentication of the user.

Example 20: the non-transitory computer-readable medium of Example 19, wherein the set of operations further includes determining a location of the user interface device based on one or more of the device attributes included in the collected data, wherein determining, with the passive biometrics component, the biometrics match assessment using the user input data and the device interaction data included in the collected data against the historical profile further includes selecting a passive biometric model from a plurality of passive biometric models based on the location of the user interface device, wherein the passive biometric model that is selected meets passive biometric standards for a geographic region including the location.

Thus, the present disclosure provides, among other things, devices, methods, systems and computer-readable media that perform frictionless multi-factor authentication. Various features and advantages of the invention are set forth in the following claims.

What is claimed is:

1. A server for performing a frictionless multi-factor authentication (fMFA), the server comprising:

a memory including a frictionless multi-factor authentication (fMFA) service, and an electronic processor communicatively coupled to the memory, the electronic processor is configured to:

receive a frictionless multi-factor authentication (fMFA) request and collected data of a user interface device, determine, with a unique device identifier (UDID) component, a unique device identifier (UDID) of the user interface device based on device attributes included in the collected data, determine, with a passive biometrics component, a biometrics match assessment using user input data and device interaction data included in the collected data against a historical profile, determine whether a user of the user interface device is authenticated under multi-factor authentication (MFA) based on the UDID and the biometrics match assessment, determine a location of the user interface device based on one or more of the device attributes included in the collected data, responsive to determining that the user is authenticated under multi-factor authentication (MFA), output a fMFA authentication response that indicates authentication of the user, and responsive to determining that the user is not authenticated under multi-factor authentication (MFA), output a fMFA denial response that indicates no authentication of the user, wherein, to determine the biometrics match assessment using the user input data and the device interaction data included in the collected data against the historical profile, the electronic processor is further configured to:

determine a biometric standard that is required by a geographic region including the location of the user interface device, and select a passive biometric model from a plurality of passive biometric models based on the biometric standard that is required by the geographic region, the plurality of passive biometric models including a first passive biometric model that meets a first one or more biometric standards of a first geographic region and a second passive biometric model that meets a second one or more biometric standards of a second geographic region, wherein the second one or more biometric standards are distinct from the first one or more biometric standards, wherein the second geographic region is separate and distinct from the first geographic region, and wherein the passive biometric model that is selected generates the biometrics match assessment.

2. The server of claim 1, wherein, to determine the unique device identifier (UDID) of the user interface device based on the device attributes included in the collected data, the electronic processor is further configured to:

extract the device attributes, user history, and account history included in the collected data, transmit a UDID request, the device attributes, the user history, and the account history to a UDID server, and receive the UDID from the UDID server.

3. The server of claim 1, wherein, to determine the unique device identifier (UDID) of the user interface device based on the device attributes included in the collected data, the electronic processor is further configured to:

extract the device attributes, user history, and account history included in the collected data, and generate, with the fMFA service, the UDID based on the device attributes, the user history, and the account history.

4. The server of claim 1, wherein, to determine the biometrics match assessment using user input data and the device interaction data included in the collected data against the historical profile, the electronic processor is further configured to:

extract the user input data and the device interaction data included in the collected data, select a passive biometrics server from a plurality of passive biometrics servers based on the passive biometric model that is selected, the passive biometrics server storing the passive biometric model that is selected, transmit a biometrics match assessment request, the user input data, and the device interaction data to the passive biometrics server that is selected, and receive the biometrics match assessment from the passive biometrics server that is selected.

5. The server of claim 1, wherein the first one or more biometric standards includes a first false positive standard, and wherein the second one or more biometric standards includes a second false positive standard that has less false positives than the first false positive standard.

6. The server of claim 1, wherein, to determine the biometrics match assessment using the user input data and the device interaction data included in the collected data against the historical profile, the electronic processor is further configured to:

extract the user input data and the device interaction data included in the collected data, and determine the biometrics match assessment with the fMFA service.

7. The server of claim 1, wherein, to receive the frictionless multi-factor authentication (fMFA) request and the collected data of the user interface device, the electronic processor is further configured to receive both the fMFA request and the collected data of the user interface device from the user interface device.

8. The server of claim 1, wherein, to receive the frictionless multi-factor authentication (fMFA) request and the collected data of the user interface device, the electronic processor is further configured to receive the fMFA request and the collected data of the user interface device from a second server that is different from the server.

9. A method for performing a frictionless multi-factor authentication (fMFA), the method comprising:

receiving, with an electronic processor of a server, a frictionless multi-factor authentication (fMFA) request and collected data of a user interface device;

determining, with the electronic processor and a unique device identifier (UDID) component, a unique device identifier (UDID) of the user interface device based on device attributes included in the collected data;

determining, with the electronic processor and a passive biometrics component, a biometrics match assessment using user input data and device interaction data included in the collected data against a historical profile;

determining, with the electronic processor, a location of the user interface device based on one or more of the device attributes included in the collected data;

determining, with the electronic processor, whether a user of the user interface device is authenticated under multi-factor authentication (MFA) based on the UDID and the biometrics match assessment;

responsive to determining that the user is authenticated under multi-factor authentication (MFA), outputting, with the electronic processor, a fMFA authentication response that indicates authentication of the user; and responsive to determining that the user is not authenticated under multi-factor authentication (MFA), outputting, with the electronic processor, a fMFA denial response that indicates no authentication of the user, wherein determining the biometrics match assessment using the user input data and the device interaction data included in the collected data against the historical profile further includes determining a biometric standard that is required by a geographic region including the location of the user interface device, and selecting a passive biometric model from a plurality of passive biometric models based on the biometric standard that is required by the geographic region, the plurality of passive biometric models including a first passive biometric model that meets a first one or more biometric standards of a first geographic region and a second passive biometric model that meets a second one or more biometric standards of a second geographic region, wherein the second one or more biometric standards are distinct from the first one or more biometric standards, wherein the second geographic region is separate and distinct from the first geographic region, and wherein the passive biometric model that is selected generates the biometrics match assessment.

10. The method of claim 9, wherein determining, with the electronic processor and the UDID component, the unique device identifier (UDID) of the user interface device based on the device attributes included in the collected data further includes extracting the device attributes, user history, and account history included in the collected data, transmitting a UDID request, the device attributes, the user history, and the account history to a UDID server, and receiving the UDID from the UDID server.

11. The method of claim 9, wherein determining, with the electronic processor and the UDID component, the unique device identifier (UDID) of the user interface device based on the device attributes included in the collected data further includes extracting the device attributes, user history, and account history included in the collected data, and generating, with a frictionless multi-factor authentication service that is stored in a memory of the server, the UDID based on the device attributes, the user history, and the account history.

12. The method of claim 9, wherein determining, with the electronic processor and the passive biometrics component, the biometrics match assessment using the user input data and the device interaction data included in the collected data against the historical profile further includes extracting the user input data and the device interaction data included in the collected data, selecting a passive biometrics server from a plurality of passive biometrics servers based on the passive biometric model that is selected, the passive biometrics server storing the passive biometric model that is selected, transmitting a biometrics match assessment request, the user input data, and the device interaction data to the passive biometrics server that is selected, and receive the biometrics match assessment from the passive biometrics server that is selected.

13. The method of claim 9, wherein the first one or more biometric standards includes a first false positive standard, and wherein the second one or more biometric standards includes a second false positive standard that has less false positives than the first false positive standard.

14. The method of claim 9, wherein determining, with the electronic processor and the passive biometrics component, the biometrics match assessment using the user input data and the device interaction data included in the collected data against the historical profile further includes extracting the user input data and the device interaction data included in the collected data, and determining the biometrics match assessment with a frictionless multi-factor authentication service that is stored in a memory of the server.

15. The method of claim 9, wherein receiving, with the electronic processor of the server, the frictionless multi-factor authentication (fMFA) request and the collected data of the user interface device further includes receiving both the fMFA request and the collected data of the user interface device from the user interface device.

16. The method of claim 9, wherein receiving, with the electronic processor of the server, the frictionless multi-factor authentication (fMFA) request and the collected data of the user interface device further includes receiving the fMFA request and the collected data of the user interface device from a second server that is different from the server.

17. A non-transitory computer-readable medium comprising instructions that, when executed by an electronic processor, causes the electronic processor to perform a set of operations comprising:

receiving a frictionless multi-factor authentication (fMFA) request and collected data of a user interface device;

determining, with a unique device identifier (UDID) component, a unique device identifier (UDID) of the user interface device based on device attributes included in the collected data;

determining, with a passive biometrics component, a biometrics match assessment using user input data and device interaction data included in the collected data against a historical profile;

determining a location of the user interface device based on one or more of the device attributes included in the collected data;

determining whether a user of the user interface device is authenticated under multi-factor authentication (MFA) based on the UDID and the biometrics match assessment;

responsive to determining that the user is authenticated under multi-factor authentication (MFA), outputting a fMFA authentication response that indicates authentication of the user; and responsive to determining that the user is not authenticated under multi-factor authentication (MFA), outputting a fMFA denial response that indicates no authentication of the user, wherein determining the biometrics match assessment using the user input data and the device interaction data included in the collected data against the historical profile further includes determining a biometric standard that is required by a geographic region including the location of the user interface device, and selecting a passive biometric model from a plurality of passive biometric models based on the biometric standard that is required by the geographic region, the plurality of passive biometric models including a first passive biometric model that meets a first one or more biometric standards of a first geographic region and a second passive biometric model that meets a second one or more biometric standards of a second geographic region, wherein the second one or more biometric standards are distinct from the first one or more biometric standards, wherein the second geographic region is separate and distinct from the first geographic region, and wherein the passive biometric model that is selected generates the biometrics match assessment.

18. The non-transitory computer-readable medium of claim 17, wherein determining, with the passive biometrics component, the biometrics match assessment using the user input data and the device interaction data included in the collected data against the historical profile further includes selecting a passive biometrics server from a plurality of passive biometrics server based on the passive biometric model that is selected, the passive biometrics server storing the passive biometric model that is selected, transmitting a biometrics match assessment request, the user input data, and the device interaction data to the passive biometrics server that is selected, and receiving the biometrics match assessment from the passive biometrics server.

19. The non-transitory computer-readable medium of claim 17, wherein the first one or more biometric standards includes a first false positive standard, and wherein the second one or more biometric standards includes a second false positive standard that has less false positives than the first false positive standard.

20. The server of claim 5, wherein the first false positive standard is one false positive in one thousand authentications, and wherein the second false positive standard is one false positive in ten thousand authentications.

\* \* \* \* \*